Nov. 8, 1938.  G. E. BARNHART  2,135,959
GUN MOUNT
Filed Jan. 10, 1938   3 Sheets-Sheet 2
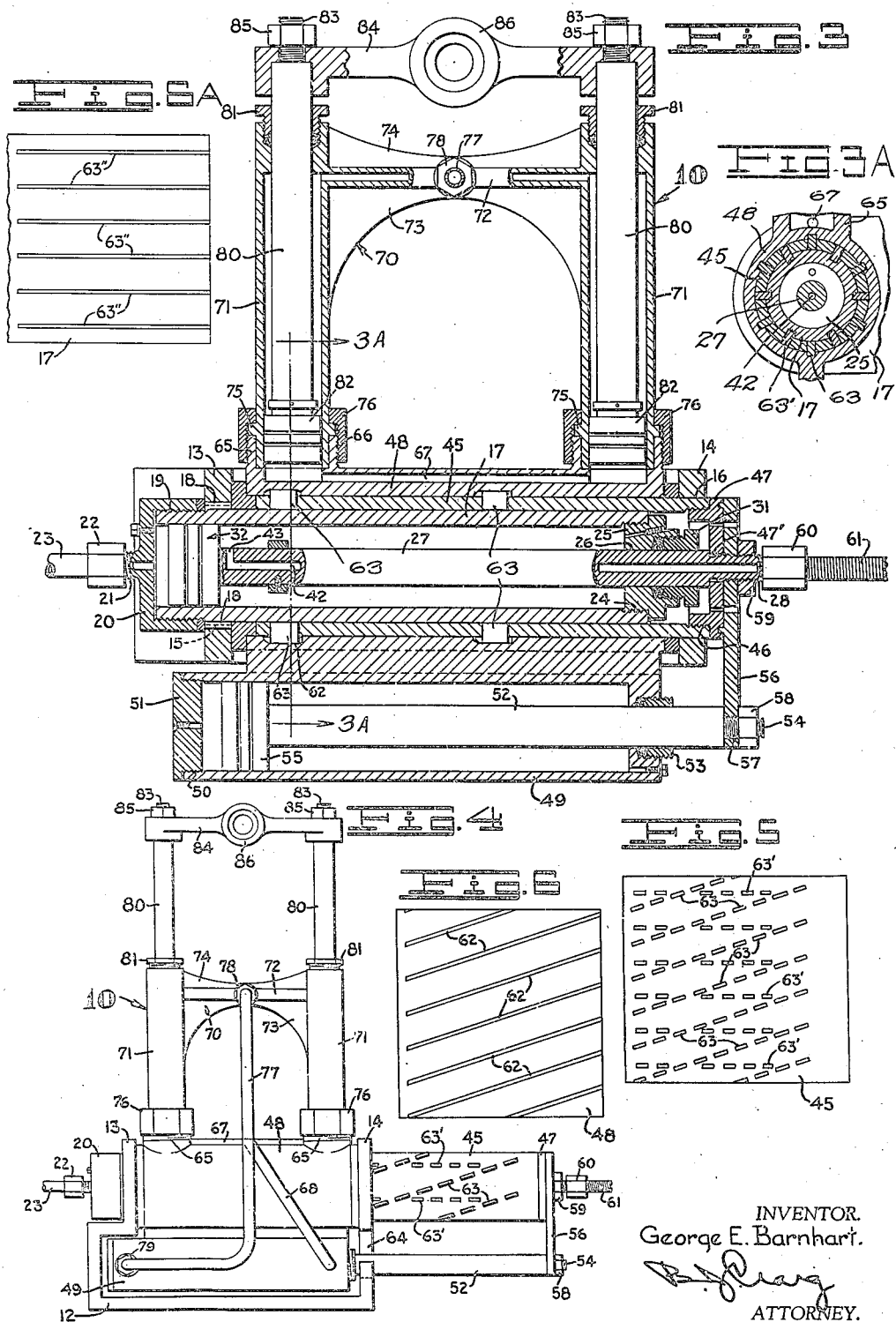
INVENTOR.
George E. Barnhart.
ATTORNEY.

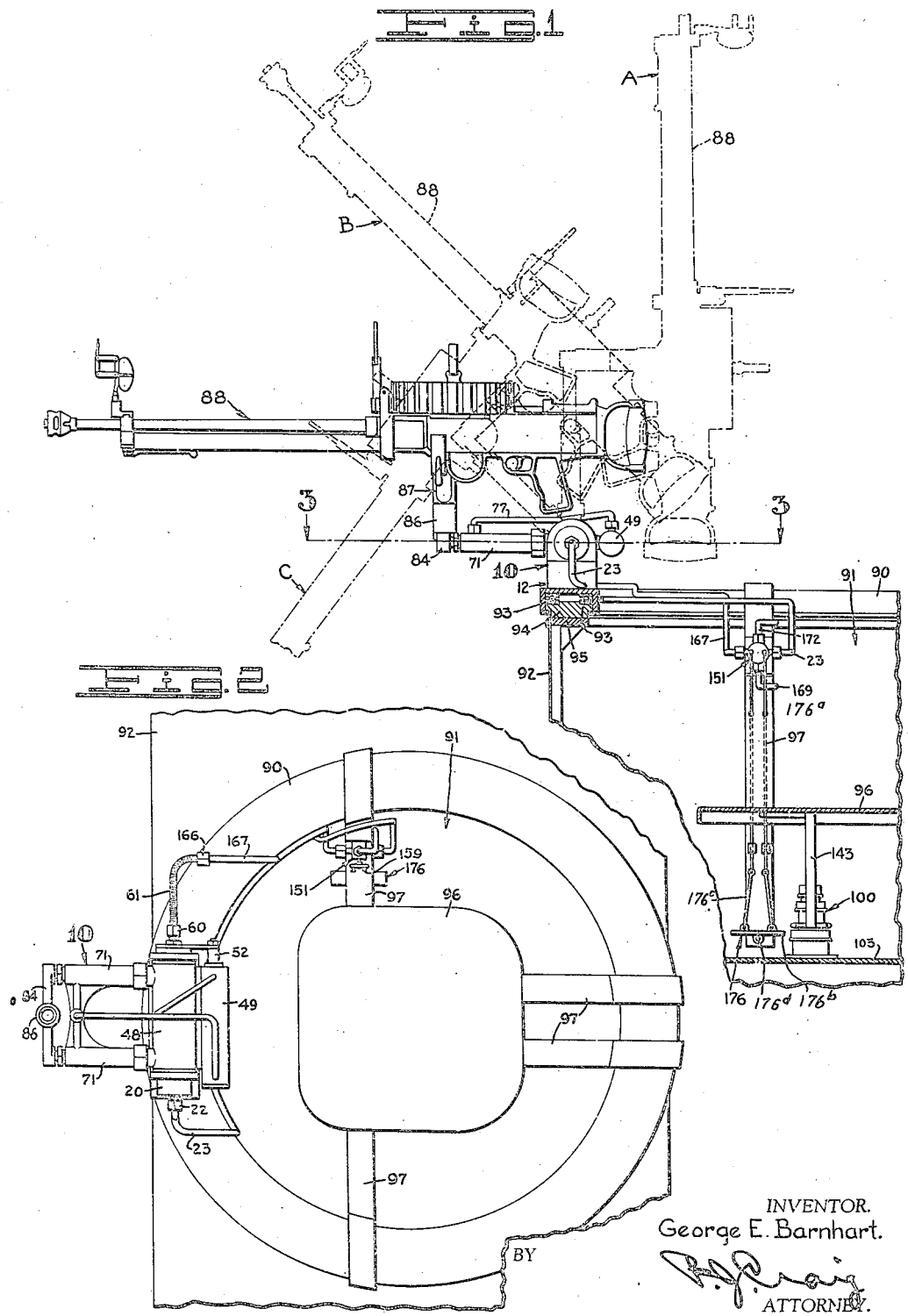

Nov. 8, 1938.  G. E. BARNHART  2,135,959
GUN MOUNT
Filed Jan. 10, 1938  3 Sheets-Sheet 3
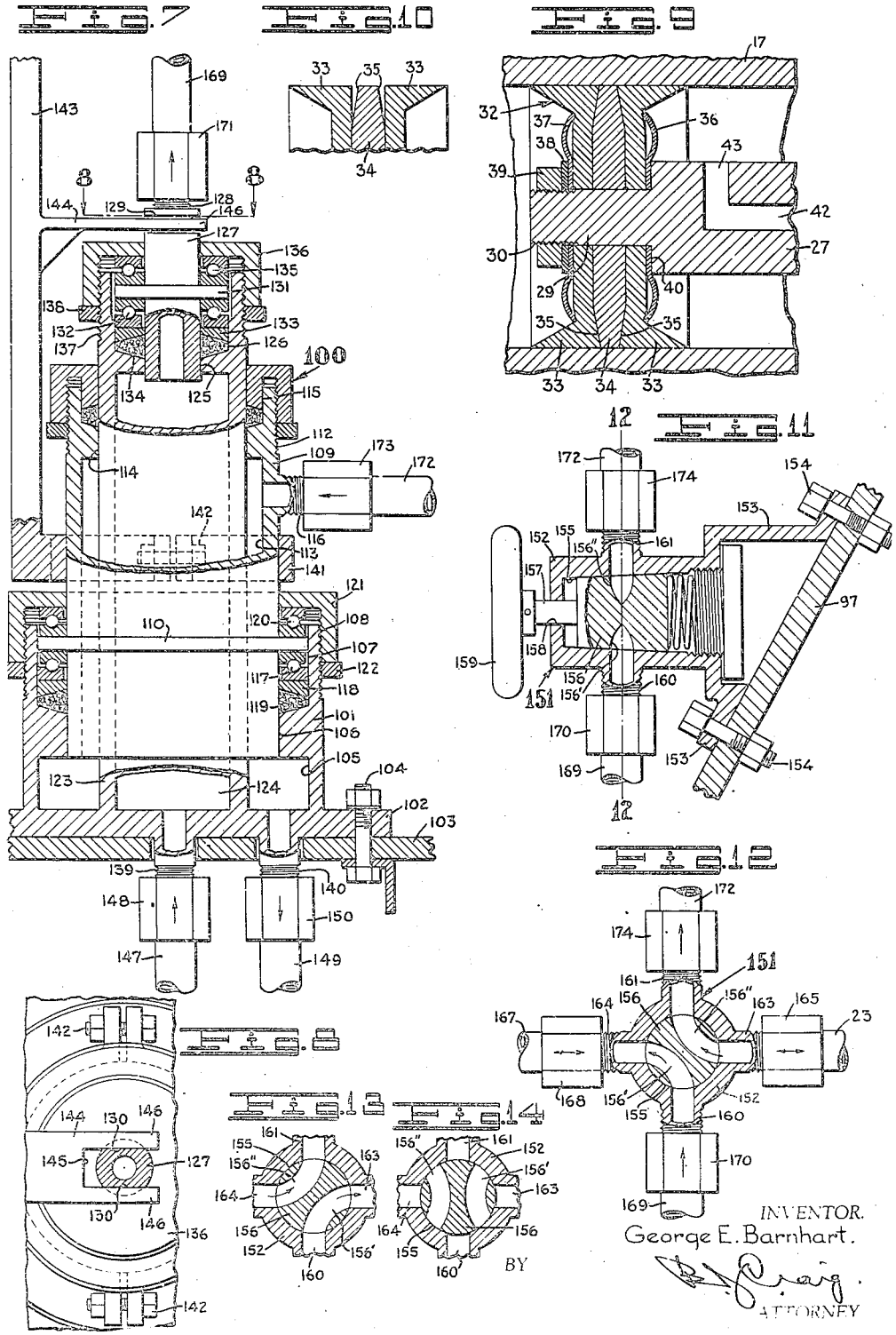
INVENTOR.
George E. Barnhart.
BY
ATTORNEY Patented Nov. 8, 1938

2,135,959

UNITED STATES PATENT OFFICE 2,135,959

GUN MOUNT

George E. Barnhart, Pasadena, Calif.

Application January 10, 1938, Serial No. 184,232

14 Claims. (Cl. 89—37.5)

This invention relates to improvements in gun mounts.

The general object of this invention is to provide an improved device for mounting guns such as machine guns.

Another object of the invention is to provide an improved machine gun mount particularly adapted for use on airplanes.

A further object of the invention is to provide a machine gun mount which is adapted to move the gun to various positions and retain the gun in the adjusted position and one which is hydraulically operated.

A still further object of the invention is to provide a novel combination of a rotatable machine gun mounting and gunner's seat wherein means is provided to cause similar rotation of the gun mount and seat.

A further object of the invention is to provide a novel control member.

Another object of the invention is to provide a novel hydraulic cylinder washer and piston.

An additional object of the invention is to provide a novel self-locking control member.

Another object of the invention is to provide a novel gun mount whereby the gun is extended while being raised to thereby provide a clearance space for the operator.

A further object of the invention is to provide a novel non-reversible self-locking control member.

A still further object of the invention is to provide a combination of a rotatable machine gun mounting and a gunner's seat and a rotatable fluid swivel member wherein means is provided to cause similar rotation of the gun mount, the seat and the swivel member.

Other objects and the advantages of this invention will be apparent from the following description taken in connection with the accompanying drawings wherein:

Fig. 1 is a fragmentary cross section through an airplane at the gunner's cockpit showing my invention applied thereto;

Fig. 2 is a top plan view of the device shown in Fig. 1;

Fig. 3 is an enlarged section through the machine gun mount taken on line 3—3 of Fig. 1;

Fig. 3A is a fragmentary section taken on line 3A—3A of Fig. 3;

Fig. 4 is an enlarged rear view of the machine gun mount showing it rotated to a vertical position;

Fig. 5 is a reduced development of the sleeve member;

Fig. 6 is a reduced development of the interior of the housing member;

Fig. 6A is a reduced fragmentary development showing the outside of the master cylinder;

Fig. 7 is an enlarged vertical section through the fluid swivel member;

Fig. 8 is a fragmentary section taken on line 8—8 of Fig. 7;

Fig. 9 is an enlarged fragmentary section through the main cylinder of the gun mount showing the piston and piston rod therein in section;

Fig. 10 is a fragmentary section of the piston shown in Fig. 8 before it is mounted;

Fig. 11 is an enlarged longitudinal section through the control valve;

Fig. 12 is a section taken on line 12—12 of Fig. 11;

Fig. 13 is a fragmentary section similar to Fig. 12; and

Fig. 14 is a fragmentary section similar to Fig. 13 showing the plug valve in a closed position.

Referring to the drawings by reference characters I have indicated my improved machine gun mount and control device generally at 10. As shown the device 10 includes a base member 12 having spaced upwardly extending end flanges 13 and 14 thereon. The flange 13 has a cylindrical aperture 15 therein and the flange 14 has a similar coaxial aperture 16 therein of greater diameter than that of the aperture 15 (see Fig. 3).

Positioned in the aperture 15 I provide a cylinder member 17 which is secured to the flange 13 by a plurality of keys 18. The cylinder 17 projects beyond the flange 13 where it is externally threaded as at 19 to receive a threaded cap member 20 which closes that end of the cylinder. The cap member 20 includes a conduit portion 21 which is externally threaded to receive a coupling member 22 to secure thereto one end of a tube 23.

The end of the cylinder 17 opposite the cap 20 is internally threaded as at 24 to receive a threaded plug member 25 which has an aperture 26 therein.

Positioned in the aperture 26 I provide a piston rod 27 one end of which includes a reduced externally threaded portion 28 and the opposite end a reduced portion 29 the end of which is externally threaded as at 30 (see Fig. 9). The plug member 25 includes a suitable packing gland member 31 surrounding the piston rod 27.

The reduced end 29 of the piston is within the cylinder 17 and has a piston 32 thereon which is shown in detail in Fig. 9. As shown the piston 32 includes an opposed pair of leather cup members 33 having a metal washer 34 therebetween. Adjacent their periphery the opposed faces of the washer 34 are convergingly tapered as indicated at 35. Adapted to engage the outer face of each of the cup members 33 I provide metallic spring washers 36 and 37 and positioned about the threaded portion I provide a washer 38 and a nut 39. The spring washer 36 is adapted to engage the shoulder 40 at the juncture of the reduced portion 29 and the main piston rod 27 while the spring washer 37 is adapted to be engaged by the washer 38. Before the piston 32 is clamped on the piston rod the rear walls of the cup members are straight as shown in Fig. 10.

When mounting the piston 32 on the piston rod 27 all the parts thereof are loosely assembled on the reduced portion 29 and then placed within the cylinder 27 before the cup member 20 is positioned thereon. Thereafter the nut 39 is tightened to tightly clamp the piston elements between the shoulder 40 and the washer 38. When the piston elements are thus clamped together the spring washers 36 and 37 bend the peripherial portions of the cup members into engagement with the tapered faces of the washer 34 thereby causing the feather edges 41 of the cup members to tightly grip the walls of the cylinder.

The piston rod 27 has an axial bore 42 therein which opens at one end through the threaded end 28 and at the other end terminates short of the piston 32 where a lateral bore 43 communicates therewith and opens through the side of the piston rod.

Surrounding the cylinder 17 I provide a sleeve member 45 the end of which adjacent the flange 14 is internally threaded as at 46 to receive a threaded cap 47.

The cap 47 has a central aperture 47' therein through which the reduced threaded portion 28 of the piston rod 27 extends.

Mounted on the sleeve 45 I provide a housing member 48 which at one side includes a cylinder portion 49. One end of the cylinder 49 is open and internally threaded as at 50 to receive a closure plug 51.

Positioned in the cylinder 49 I provide a piston rod 52 which extends out of the cylinder through a suitable packing gland 53 and is provided with a reduced threaded portion 54. Within the cylinder 49 the piston rod 52 has a piston 55 mounted thereon. The piston 55 is preferably constructed the same as the previously described piston 32.

Mounted on the reduced portion 28 of the piston rod 27 I provide a connector member 56 which extends towards the piston rod 52 and has an aperture 57 therein in which the reduced portion 54 of the piston rod 52 is positioned. A nut 58 on the threaded portion 54 secures the connector member 56 to the piston rod 52. A nut 59 on the threaded portion 28 of the piston rod 27 securely clamps the piston rod 27 to the cap member 47 and the connector member 56 to the cap member 47.

Beyond the nut 59 a suitable coupling member 60 connects a flexible conduit 61 to the portion 28 of the piston rod 27.

The housing 48 has a plurality of longitudinally extending, spiral keyways 62 therein (see Fig. 6).

The sleeve 45 has a plurality of longitudinally extending spirally arranged sets of keys 63 therein which are positioned in the keyways 62 of the housing 48 (see Fig. 5). For preventing the sleeve 45 from rotating I may provide a plurality of sets of keys 63' which are positioned in keyways 63'' in the outer face of the master cylinder 17 (see Figs. 4, 5 and 6A).

From the foregoing it will be apparent that when the piston 32 moves towards the flange 14 it will move the sleeve 45 with it and the keys 63 will move in a straight line thereby causing the housing 48 to rotate upward in a clockwise direction. When the piston 32 and the sleeve 45 move towards the flange 13 the keys 63 cause the housing 48 to rotate downward in an anticlockwise direction. Furthermore when the piston rod 27 is moved the piston 55 is similarly moved through the medium of the connector member 56. The flange 14 includes an arcuate slot 64 to provide clearance for the piston rod 52 when the housing 48 is rotated.

Opposite the cylinder 49 the housing 48 has a pair of spaced hollow bosses 65 thereon which are externally threaded as at 66. The housing 48 includes a longitudinally extending conduit 67 which opens into each of the hollow bosses 65 and a transversely extending conduit member 68 one end of which communicates with the conduit 67 and the opposite end opens into the cylinder 49 adjacent the end nearest the flange 14 (see Fig. 4).

A frame member which is indicated generally at 70 is mounted on the bosses 65. As shown the frame member 70 includes a pair of spaced cylinders 71 connected adjacent their outer ends by a conduit portion 72 and rib portions 73 and 74. The conduit 72 opens into the interior of both the cylinders 71. Spaced from the ends of the cylinders opposite the conduit 72 each of the cylinders 71 includes an enlarged flange 75 which engages the end of the associated boss 65. The portion of the cylinder between the flange 75 and the adjacent end is positioned in its associated boss 65. A coupling nut 76 engages the flange 75 and the threads 66 of the boss 65 and when tightened securely clamps the associated cylinder 71 and boss 65 together.

One end of a removable conduit member 77 is connected as at 78 to the conduit 72. The opposite end of the conduit 77 is connected as at 79 to the cylinder 49 and communicates with the interior thereof adjacent the end nearest the flange 13.

Positioned in each of the cylinders 71 I provide a piston rod 80 each of which extends out of its associated cylinder through a suitable packing gland 81. Within the cylinders each of the piston rods 80 has a piston 82 thereon which is similar in construction to the previously described piston 32. The outer ends of the piston rod 80 each include a reduced threaded portion 83 and mounted on the outer ends of the piston rods I provide a cross head 84 which is secured to the piston rods by nuts 85 on the threaded portions 83.

Intermediate the piston rods 80 the cross head 84 includes an upwardly extending socket portion 86 in which as shown in Fig. 1 the trunnion 87 of a machine gun assembly is positioned and secured thereto in the usual manner.

From the foregoing it will be apparent that when the cylinders 17, 49 and 71 are filled with oil or other suitable fluid on both sides of the pistons therein and the piston 55 is moved towards the flange 14 the piston 55 will force oil through the conduits 68 and 67 into the cylinders 71 thereby forcing the pistons 82 and the piston rods 80 outward.

Thus as the housing 48 rotates upward in a clockwise direction as previously described the cross head 84 and the gun 88 thereon is moved upward and outward. When the piston 55 is moved towards the flange 13 as previously described the piston 55 forces oil through the conduits 71 and 72 into the cylinders 71 thereby forcing the pistons 82 and the piston rods 80 inward. Thus as the housing 48 rotates downward in an anti-clockwise direction as previously described the cross head 84 and the gun 88 thereon are moved downward and inward.

As shown in Figs. 1 and 2 the base 12 of the device 10 is adapted to be mounted on a ring member 90 which surrounds a gunner's cockpit 91 in the fuselage 92 of an airplane. As shown the ring 90 is preferably supported on anti-friction bearings 93 which in turn are supported on a base ring 94 which is mounted on a portion 95 of the fuselage structure. A gunner's seat 96 is hung within the cockpit by metal straps 97 secured to the ring 90.

Below the gunner's seat 96 I provide a swivel connector member which is indicated generally at 100 and shown in detail in Fig. 7. As shown the connector member 100 includes a cylindrical base member 101 having a bottom wall 102 which is secured to the floor structure 103 of the cockpit by nuts and bolts 104. The base 101 has a chamber 105 therein and a reduced bore 106 the lower end of which opens into the chamber 105 and the upper end into an enlarged recess 107. Adjacent the upper end the base 101 includes an externally threaded portion 108.

Positioned in the bore 106 I provide a sleeve member 109 having an enlarged flange 110 thereon. At the upper end the sleeve 109 includes an externally threaded portion 112. The sleeve 109 further includes a downwardly opening recess 113 and a reduced bore 114 the lower end of which opens into the recess 113 and the upper end opens into an enlarged recess 115. Intermediate the flange 110 and the threads 112 the sleeve 109 includes a lateral externally threaded conduit portion 116.

The sleeve member 109 is positioned in the base 101 with the sleeve flange 110 in the recess 107 and the portion therebelow positioned in the bore 106. Below the sleeve flange 110 I provide an anti-friction bearing member 117 positioned on a packing ring 118 which in turn rests on a suitable packing material 119 surrounding the sleeve. Above the sleeve flange 110 I provide an anti-friction bearing 120. Surrounding the sleeve 109 above the bearing 120 I provide an internally threaded cap member 121 which engages the threads 108 of the base 101. The cap 121 engages the bearing 120 and is adapted to be tightened on the base 101 until the packing 119 is compressed sufficiently to provide a fluid tight seal around the sleeve 109. The cap 121 is adapted to be locked in an adjusted position by a lock nut 122 on the threaded portion 108.

Coaxial with the bore 106 the base includes a column 123 having a lower chamber 124 therein. Adjacent the upper end the column 123 has a reduced bore 125 therein the lower end of which opens into the chamber 124 and the upper end opens into an enlarged recess 126. Positioned in the bore 125 I provide a hollow conduit member 127 which includes an externally threaded upper portion 128 and slightly below the threads 128 the conduit 127 is grooved as at 129 to form opposed flat faces 130 (see Fig. 8).

Intermediate the groove 129 and its lower end the conduit member 127 includes an enlarged flange portion 131 which is positioned within the recess 126 of the column 123. Below the flange 131 I provide an anti-friction bearing member 132 positioned on a packing ring 133 which in turn rests on a suitable packing material 134 surrounding the conduit member 127. Above the flange 131 I provide an anti-friction bearing member 135. Surrounding the conduit 127 above the bearing 135 I provide an internally threaded cap member 136 which engages a threaded portion 137 of the column 123. The cap 136 engages the bearing 135 and is adapted to be tightened on the column 123 until the packing 134 is compressed sufficiently to provide a fluid tight seal around the conduit member 127. The cap 136 is adapted to be locked in an adjusted position by a lock nut 138 on the threaded portion 137.

The base 101 includes a downwardly extending externally threaded intake conduit 139 which communicates with the chamber 124 of the column 123 and a downwardly extending externally threaded return conduit 140 which communicates with the chamber 105.

Intermediate the cap 121 and the conduit 116 a ring member 141 is clamped to the sleeve 109 by means of nuts and bolts 142. As shown a portion of the ring member 141 includes an upwardly extending leg portion 143 the upper end of which is adapted to be secured to the seat 96 in any desired manner as shown in Fig. 1. Adjacent the cap 136 the leg 143 includes a lateral arm 144 the outer portion of which is recessed as at 145 to form prongs 146 (see Fig. 8).

The prongs 146 are positioned in the groove 129 of the conduit member 127 and the inner faces thereof engage the flat faces 130 of the groove. Thus it will be seen that when the gun mount supporting ring 90 and the seat 96 rotate the sleeve member 109 and the conduit member 127 will be rotated therewith through the medium of the leg 143.

One end of a pressure supply conduit 147 is connected to the conduit 139 by a suitable coupling member 148 and the opposite end communicates with the standard high pressure fluid supply line of the airplane.

One end of a return conduit 149 is connected to the conduit 140 by a suitable coupling member 150 and the opposite end communicates with the standard fluid return line of the airplane.

Mounted on one of the seat straps 97 I provide a control valve which is indicated generally at 151 and shown in detail in Figs. 11 and 12. The control valve 151 includes a body portion 152 having legs 153 thereon which are secured to one of the seat straps 97 by nuts and bolts 154. The body has a tapered recess 155 therein in which a tapered plug valve 156 is positioned and the plug valve 156 includes a stem 157 which projects out of the body 152 through an aperture 158 and has an operating handle 159 thereon. The housing 152 includes a depending externally threaded inlet conduit 160 and thereabove an upwardly extending externally threaded outlet conduit 161. At right angles to the conduits 160 and 161 the body at one side includes an externally threaded conduit 163 and opposite the conduit 163 an externally threaded conduit 164.

The plug valve 156 has a conduit 156' and a conduit 156'' threaded. The opposite ends of the conduits 156' and 156'' are arranged at right angles to each other so that in one position of the plug valve the conduit 156' communicates with the inlet conduit 160 and the conduit 164 and the conduit 156'' communicates with the return conduit 161 and the conduit 163 (see Fig.

12). In another position of the plug valve 156 the conduit 156' communicates with the inlet conduit 160 and the conduit 163 and the plug valve conduit 156" communicates with the outlet conduit 161 and the conduit 164 (see Fig. 13). When the plug valve 156 is in a closed position as shown in Fig. 14 the plug valve conduits 156' and 156" do not communicate with any of the housing conduits 160, 161, 163 or 164.

The conduit 23 from the device 10 is connected to the valve conduit 163 by a suitable coupling member 165. The flexible tubing 61 of the device 10 is connected by a suitable coupling member 166 (Fig. 2) to one end of a conduit 167 the opposite end of which is connected by a suitable coupling member 168 to the conduit 164 of the control valve 151. One end of a conduit 169 is connected by a suitable coupling member 170 to the inlet conduit 160 of the control valve 151 and the opposite end of the conduit 169 is connected by a suitable coupling member 171 to the outlet conduit member 127 of the device 100. One end of a conduit 172 is connected by a coupling member 173 to the conduit 116 of the device 100 and the opposite end of the conduit 172 is connected by a coupling 174 to the outlet conduit 161 of the control valve 151.

In operation fluid under pressure from the main pressure line of the airplane flows through the conduit 147 into the chamber 124 of the device 100 and flows therefrom through the conduit member 127 and the conduit 169 to the inlet conduit 160 of the control valve 151.

When the operator desires to elevate the machine gun assembly 88 he rotates the plug valve 156 so that the plug valve conduit 156' affords communication between the inlet conduit 160 and the conduit 163 as shown in Fig. 13 whereupon fluid under pressure flows through the conduit 23 into the cylinder 17 thereby forcing the piston 32 and the piston rod 27 outward whereupon the gun assembly is swung upward and outward as previously described. When the gun assembly 88 reaches the desired position the operator rotates the plug valve 156 to a closed position as shown in Fig. 14.

When the operator desires to lower the machine gun assembly 88 he rotates the plug valve 156 to the position shown in Fig. 13 wherein the plug valve conduit 156' affords communication between the inlet conduit 160 and the conduit 164 whereupon fluid under pressure flows through the conduit 167 and the flexible conduit 61 into the cylinder 17 thereby forcing the piston 32 and the piston rod 27 to a retracted position whereupon the gun assembly is swung downward and inward as previously described.

When fluid is forced into the cylinder through the conduit 23 the fluid in the cylinder on the opposite side of the piston 32 flows therefrom through the flexible conduit 61 and the conduit 167 into the valve 151 and through the plug valve conduit 156" into the conduit 172, through the conduit 172 into the chamber 105 of the device 100 and thence through the conduit 149 to the main oil return line of the airplane. Likewise when fluid is forced into the cylinder 17 through the conduits 61 and 167 the fluid in the cylinder on the opposite side of the piston 23 flows therefrom through the conduit 23 into the valve 151 and through the plug valve conduit 156" into the conduit 172 and thence into the chamber 105 of the device 100.

By having the seat 96 and the gun mount ring 90 connected the operator can swing himself and the ring 90 by pushing one away or the other with his feet thereby leaving both hands free, one hand to operate the control valve 151 and the other to tilt and fire the gun. Furthermore a suitable foot operated control for the valve 151 is indicated at 176 in Fig. 1 and when this control is employed the gunner has both hands free to operate the guns. The control 176 includes a pair of links 176a connected to the valve 151 at one end and at the other end connected to opposite ends of a treadle 176b by links 176c. The treadle is pivoted at 176d and the construction is such that treadle rotates with the seat 96 and when the treadle is rocked about its pivot it rocks the valve 151.

With the device 10 the machine gun assembly can be swung from a horizontal position as shown in Fig. 1 to a straight vertical position as shown by the broken line position indicated at A or to any intermediate position as indicated at B. To shoot downward the machine gun assembly 88 is tilted downward about its standard transverse pivot as shown by the dotted line position indicated at C.

Although I have shown and described my control member as embodied in a mount for machine guns it will be understood that principle thereof may be applied in various other forms. With my control in any embodiment thereof should the hydraulic pressure fail the member being operated is held in a non-reversible self-locking position.

From the foregoing description it will be apparent that I have invented a novel control member and gun mount which is simple in construction and operation and which is highly efficient for the intended purpose.

Having thus described my invention I claim:

1. In a control device, a base member, a cylinder mounted on said base, a piston in said cylinder, means to reciprocate said piston, a sleeve member slidably mounted on said cylinder, means to prevent rotation of said sleeve relative to said piston, means connecting said sleeve and said piston whereby when said piston is moved said sleeve is similarly moved, and a housing member surrounding said sleeve, said sleeve and said housing including coacting spirally arranged keyways and keys whereby longitudinal movement of said sleeve causes said housing to rotate about the axis of said sleeve.

2. In a control device, a base member, a cylinder mounted on said base, said cylinder being closed at each end, a piston in said cylinder, a piston rod on said piston and projecting from said cylinder, means to convey fluid under pressure to each side of said piston, a sleeve member, means to mount said sleeve on said cylinder for rectilinear movement, means whereby said piston rod and sleeve move together, and a housing member on said sleeve, means on said sleeve and said housing operable upon longitudinal movement of said sleeve to cause said housing to rotate about the axis of said sleeve.

3. In a machine gun mount, a base member, a cylinder mounted on said base, said cylinder being closed at each end, a piston in said cylinder a piston rod on said piston and projecting from said cylinder, means to convey fluid under pressure to each side of said piston, a sleeve member, means to mount said sleeve in said cylinder for rectilinear movement, means whereby said piston rod and sleeve move together, a housing member on said sleeve, said sleeve and said housing including coacting spirally arranged keyways and keys whereby longitudinal movement of said sleeve causes said housing to rotate about the axis of said sleeve, and a gun support on the housing.

4. In a machine gun mount, a base member, a cylinder mounted on said base, said cylinder being closed at each end, a piston in said cylinder, a piston rod on said piston and projecting from said cylinder, said piston rod having a conduit therein opening through the free end thereof and opening into said cylinder adjacent said piston, means to convey fluid under pressure to said piston rod conduit and means to convey fluid under pressure into said cylinder on the opposite side of said piston, a sleeve member, means to mount said sleeve in said cylinder for rectilinear movement, means whereby said piston rod and sleeve move together, a housing member on said sleeve, said sleeve and said housing including coacting spirally arranged keyways and keys whereby longitudinal movement of said sleeve causes said housing to rotate about the axis of said sleeve, and a gun support on the housing.

5. In a machine gun mount, a base member, a cylinder mounted on said base, said cylinder being closed at each end, a piston in said cylinder, a piston rod on said piston and projecting from said cylinder, said piston rod having a conduit therein opening through the free end thereof and opening into said cylinder in front of said piston, means to convey fluid under pressure to said piston rod conduit and means to convey fluid under pressure into said cylinder at the rear of said piston, a sleeve member slidably mounted on said cylinder, means to prevent rotation of said sleeve relative to said cylinder, means connecting said sleeve and said piston rod whereby when said piston rod is moved said sleeve is similarly moved, a housing member surrounding said sleeve, said sleeve and said housing including coacting spirally arranged keyways and keys whereby longitudinal movement of said sleeve causes said housing to rotate about the axis of said sleeve, and a gun support on the housing.

6. In a machine gun mount, a base member, a cylinder rigidly mounted on said base, said cylinder being closed at each end, a piston in said cylinder, said piston including a piston rod, said piston rod extending from the front end of said cylinder through a suitable packing gland, said piston rod having a conduit therein opening through the front end thereof and opening into said cylinder in the front of said piston, means to convey fluid under pressure to said piston rod conduit, means to convey fluid under pressure into the seat portion of said cylinder, a sleeve member mounted to slide in keys on said cylinder, means connecting said sleeve and said piston rod whereby when said piston rod is moved said sleeve is similarly moved, a housing member surrounding said sleeve, said sleeve and said housing including coacting spirally arranged keyways and keys whereby longitudinal movement of said sleeve causes said housing to rotate about the axis of said sleeve.

7. In a machine gun mount, a base member, a cylinder fixed on said base, said cylinder being closed at each end, a piston in said cylinder, said piston including a piston rod projecting beyond said cylinder, means to convey fluid under pressure to the opposite sides of said piston, a sleeve member slidably and non-rotatably mounted on said cylinder, means whereby said piston rod and sleeve move together, a housing member surrounding said sleeve, said sleeve and said housing including coacting means whereby longitudinal movement of said sleeve causes said housing to rotate about the axis of said sleeve, said housing including a cylinder portion closed at both ends and having a piston therein including a piston rod projecting therefrom, means whereby when said first piston rod moves said second piston rod will be similarly moved, a pair of spaced cylinder members on said housing disposed at right angles to said first cylinder and closed at both ends, each of said pair of cylinders having a piston with a piston rod projecting therefrom, a cross head member connecting said pair of piston rods, means on said cross head adapted to support a machine gun assembly, a conduit means opening into said pair of cylinders adjacent the inner ends thereof and communicating with one end of said housing cylinder, a second conduit means opening into said pair of cylinders adjacent the outer ends thereof and communicating with the other end of the housing cylinder.

8. In a machine gun mount, a base member, a cylinder fixed on said base, said cylinder being closed at each end, a piston in said cylinder, said piston including a piston rod projecting beyond said cylinder, means to convey fluid under pressure to the opposite sides of said piston, a sleeve member slidably and non-rotatably mounted on said cylinder, means whereby said piston rod and sleeve move together, a housing member surrounding said sleeve, said sleeve and said housing including coacting means whereby longitudinal movement of said sleeve causes said housing to rotate about the axis of said sleeve, said housing including a cylinder portion closed at both ends and having a piston therein including a piston projecting therefrom, means whereby when said first piston rod moves said second piston rod will be similarly moved, a pair of spaced cylinder members on said housing disposed at right angles to said first cylinder and closed at both ends, each of said pair of cylinders having a piston with a piston rod projecting therefrom, a cross head member connecting said pair of piston rods, means on said cross head adapted to support a machine gun assembly, a conduit means opening into said pair of cylinders adjacent the inner ends thereof and a conduit means opening into said pair of cylinders adjacent the outer ends thereof, a conduit means communicating with said first conduit and opening into said housing cylinder adjacent the outer end thereof whereby when said second piston moves outward it forces fluid into said pair of cylinders to force said associated pistons and piston rods outward, a conduit means communicating with said second conduit and opening into said housing cylinder adjacent the inner end thereof whereby when said second piston moves inward it forces fluid into said pair of cylinders to force said associated pistons and piston rods inward.

9. In a machine gun mount, a base member, a cylinder on said base, a piston in said cylinder, a piston rod on said piston, means to supply fluid to the front of the cylinder, means to supply fluid to the rear of said cylinder, a sleeve, means to mount said sleeve on said cylinder for rectilinear movement so that the two move together, a housing member surrounding said sleeve, said sleeve and said housing including coacting means whereby longitudinal movement of said sleeve causes said housing to rotate about the axis of said sleeve, said housing including a cylinder portion closed at both ends and having a piston therein including a piston rod projecting from said housing cylinder, means whereby when said first piston moves together said housing piston is moved, a pair of spaced cylinder members on said housing and disposed at right angles to said first cylinder, said pair of cylinders being closed at both ends, a piston having a projecting piston rod and disposed in each of said pair of cylinders, means connecting said pair of piston rods, means on said cross head adapted to receive a mounting portion of a machine gun assembly, conduit means opening into said pair of cylinders adjacent the inner ends thereof and a conduit means opening into said pair of cylinders adjacent the outer ends thereof, a conduit means communicating with said pair of cylinder's first conduit and opening into said housing cylinder adjacent the outer end thereof whereby when said second piston moves outward it forces fluid into said pair of cylinders to force said associated pistons and piston rods outward, a conduit means communicating with said pair of cylinder's second conduit and opening into said housing cylinder adjacent the inner end thereof whereby when said second piston moves inward it forces fluid into said pair of cylinders to force said associated pistons and piston rods inward.

10. In a control device, a base, a cylinder mounted on said base, said cylinder being closed at each end, a piston in said cylinder, fixed conduit means rigid on said cylinder to convey fluid under pressure to each side of said piston, a sleeve member, means to mount said sleeve on said cylinder for rectilinear movement, means whereby said piston and sleeve move together, a housing member on said sleeve, and means on said sleeve and said housing operable upon longitudinal movement of said sleeve to cause said housing to rotate about the axis of said sleeve.

11. In a machine gun mount, a base, a cylinder mounted on said base, a piston in said cylinder, means to reciprocate said piston, a member slidably mounted on said cylinder, means to prevent rotation of said member relative to said piston, means connecting said member and said piston whereby when said piston is moved said member is similarly moved, a housing mounted for rotary movement about the axis of said cylinder, means to prevent axial movement of the housing, said member and said housing including coacting means whereby longitudinal movement of said member causes said housing to rotate, and a support on the housing.

12. In a machine gun mount, a support, a cylinder on said support, a piston in said cylinder, means to move said piston, a sleeve slidably and non-rotatably mounted on said cylinder, means whereby said piston rod and sleeve move together, a housing member surrounding said sleeve, said sleeve and said housing including coacting means whereby longitudinal movement of said sleeve causes said housing to rotate about the axis of said sleeve, said housing including a cylinder portion having a piston therein, means whereby when said first piston rod moves said second piston rod will be similarly moved, a third cylinder on said housing disposed at right angles to said first cylinder, said third cylinder having a piston thereon, a machine gun support, means on said third piston to move said machine gun support, conduit means opening into said third cylinder adjacent the inner end thereof and communicating with one end of said housing cylinder, and a second conduit means opening into said third cylinder adjacent the outer end thereof and communicating with the other end of the housing cylinder.

13. In a machine gun mount, a support, a cylinder on said support, a piston in said cylinder, means to move said piston, a sleeve slidably and non-rotatably mounted on said cylinder, means whereby said piston rod and sleeve move together, a housing member surrounding said sleeve, said sleeve and said housing including coacting means whereby longitudinal movement of said sleeve causes said housing to rotate about the axis of said sleeve, a pair of spaced cylinder members on said housing disposed at an angle to said cylinder, each of said pair of cylinders having a piston thereon with a piston rod projecting therefrom, a cross head member connecting said pair of piston rods, means on said cross head adapted to support a machine gun assembly, and means to operate the pistons in said pair of cylinders.

14. In a machine gun mount, a support, a cylinder on said support, a piston in said cylinder, means to move said piston, a sleeve slidably and non-rotatably mounted on said cylinder, means whereby said piston rod and sleeve move together, a housing member surrounding said sleeve, said sleeve and said housing including coacting means whereby longitudinal movement of said sleeve causes said housing to rotate about the axis of said sleeve, said housing including a cylinder portion having a piston therein, means whereby when said first piston rod moves said second piston rod will be similarly moved, a pair of spaced cylinder members on said housing disposed at right angles to said first cylinder, each of said pair of cylinders having a piston with a piston rod projecting therefrom, a cross head member connecting said pair of piston rods, means on said cross head adapted to support a machine gun assembly, a conduit means opening into said pair of cylinders adjacent the inner ends thereof and communicating with one end of said housing cylinder, and a second conduit means opening into said pair of cylinders adjacent the outer ends thereof and communicating with the other end of the housing cylinder.

GEORGE E. BARNHART.